Dec. 17, 1957 R. M. W. JOHNSON 2,817,015

SHUNT GATING CIRCUIT

Filed May 18, 1953

INVENTOR.
RALPH M. W. JOHNSON,
BY Nicholas T Volsk
his ATTORNEY.

2,817,015

SHUNT GATING CIRCUIT

Ralph M. W. Johnson, Los Angeles, Calif., assignor, by mesne assignments, to Hughes Aircraft Company, a corporation of Delaware Application May 18, 1953, Serial No. 355,486

3 Claims. (Cl. 250—27)

This invention relates to electronic gating circuits, and more particularly to shunt gating circuits suitable for selectively passing signals of one polarity coincident with a selector pulse while rejecting anticoincident signals of that polarity and all signals of opposite polarity.

It is frequently desirable to pass selectively a pulse or pulses from among a train of pulses or to pass periodic pulses while excluding the intervening noise and spurious signals. For these purposes various types of time selection or gating circuits are commonly employed.

Within the broad classification of time selection circuits, gating circuits are distinguished from switching circuits in that the former serve to transmit an applied signal whereas the latter produce a new signal as a result of the coincident application of two or more signals. Gating circuits may be classified according to their function as dipolar, which transmit signals of both polarities during the selected interval of time, and unipolar, which transmit signals of only one polarity. The disclosed invention relates to unipolar gating circuits.

The functioning of a unipolar gating circuit involves the processes of time selection, of rectification, and of clamping. The selection of signals of one polarity only through rectification tends to change the average potential of a signal and therefore necessitates the clamping of flat portions of the signal.

The prior art includes a vast number of switching circuits and dipolar gating circuits, but a relatively small number of unipolar gating circuits. Several unipolar gating circuits are described in "Waveforms," by Britton Chance, McGraw-Hill Book Co., Inc., 1949, at pages 364 to 381. A unipolar gating circuit is also disclosed in the patent to Hindall, U. S. 2,597,796. Hindall's circuit serves to pass negative signals to an output, while the disclosed invention passes those of positive polarity only. Limitations of the prior art circuits have included complexity, multiplicity of circuit elements, the production of a pedestal voltage at the output, attenuation and distortion of the selected signals, variations in the output signal amplitude with variations in the amplitude of the selector pulse, poor rejection ratio for undesired signals, inability to reject signals of amplitude exceeding that of the selector pulse, capacitance coupling of high-frequency components to output in rejection of undesired pulses, non-linearity, presenting a low impedance to input signals, presenting a low input impedance to selector pulses, and limitations on the character of the load to be utilized with the gating circuit. The disclosed invention minimizes all of the above disadvantages.

The disclosed invention comprises a video amplifier and a shunt gating circuit interconnected in such fashion as to achieve signal rejection through effective shunting outside of the gate interval, maximum gain of the amplifier during the gate interval and efficient transmission of positive signals coupled with efficient shunting of negative signals, effective clamping of the output quiescent potential, and linear signal transmission independent of the amplitude or shape of selector pulses.

It is therefore an object of this invention to provide electronic gating circuits suitable for selectively passing signals of one polarity coincident with a selector pulse while rejecting anticoincident signals of that polarity and all signals of opposite polarity.

It is a further object of the invention to provide shunt gating circuits capable of shunting the undesired signals more effectively than the shunt circuits of the prior art, and also capable of producing a useful signal with less attenuation and distortion than it has been possible to attain with the prior shunt circuits.

An additional object of the invention is to provide gating circuits in which linearity and amplitude of the output signals are independent of the linearity and amplitude of the applied gate pulse or selector pulse.

Another object of the invention is to provide shunt gating circuits particularly suitable for rejecting high amplitude pulses outside of the gating interval with a minimum of capacitance coupling of the high-frequency components thereof.

Another object of the invention is to provide a circuit utilizing a diode, a triode, two or more resistors and two or more capacitors, together with an amplifier circuit, for the purpose of receiving negative pulses and amplifying and selecting such pulses as are coincident with an applied gate pulse and passing them to an output circuit as positive pulses.

Another object of the invention is to provide a circuit comprising a class A amplifier energized by a source of signals and including a thermionic tube having a plate, an output circuit impedance, a capacitor having a first plate connected to the plate of said amplifier and a second plate connected to said impedance, first and second normally conductive unidirectional devices connected to said second plate for shunting all signals away from said impedance, and a source of gate pulses connected to said first unidirectional device for making said first device non-conductive whereby only negative signals are shunted away from said impedance by said second device.

The novel features which are believed to be characteristic of the invention, both as to its organization and method of operation, together with further objects and advantages thereof, will be better understood from the following description considered in connection with the accompanying drawings, in which two embodiments of the invention are illustrated by way of example. It is to be expressly understood, however, that the drawings are for the purpose of illustration and description only, and are not intended as definitions of the limits of the invention.

The invention will be described in connection with the accompanying drawings in which.

Figure 1:
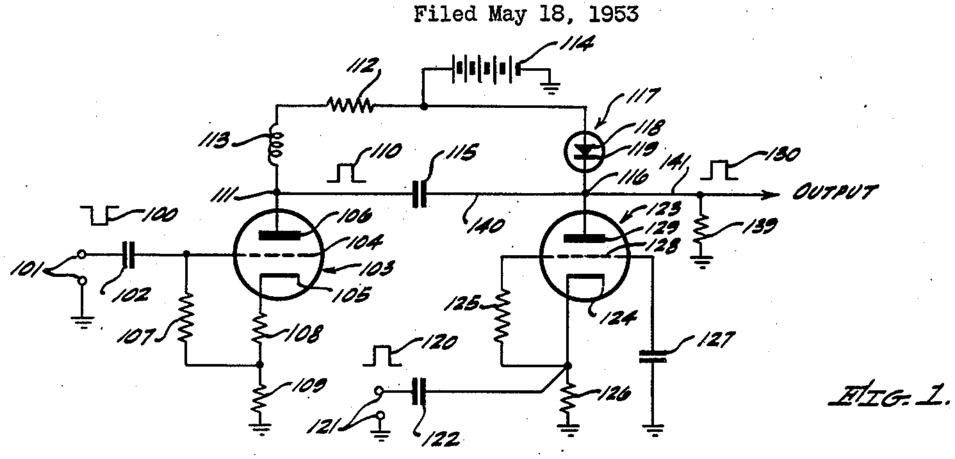
Fig. 1 is a schematic diagram of a gating circuit in accordance with the instant invention.

Referring to Fig. 1, an input signal 100 is impressed on the grid of a triode 103 through a capacitor 102, triode 103 being a class A video amplifier. The cathode 105 of the same triode is grounded through biasing resistors 108 and 109, grid 104 being connected to the junction between resistors 108 and 109 through a grid resistor 107. Plate 106 of triode 103 is connected to the positive terminal of a source of direct potential 114 through a plate resistor 112 and a peaking coil 113. Since triode 103, as mentioned previously, is a class A amplifier, it is normally conductive, and therefore, will transmit positive as well as negative signals when such are impressed on grid 104. When a negative signal, such as pulse 100, is impressed on grid 104, it will appear as a positive pulse 110 in the plate at junction 111 which connects the plate of triode 103 to a coupling condenser 115, the latter interconnecting the plates of the triodes 103 and 123.

Triode 123 has its cathode 124 grounded through a cathode resistor 126, and its control grid 128 is connected to cathode 124 through a grid resistor 125 and to ground through a capacitor 127, thus rendering triode 123 normally conductive.

Plate 129 of triode 123 is directly connected to the cathode 119 of diode 117, the anode 118 of which is also connected to the positive terminal of the source of direct potential 114. The conductor interconnecting plate 129 to cathode 119 forms an electrical junction 116 with two conductors 140 and 141, conductor 140 connecting junction 116 to one plate of condenser 115, while conductor 141 connects this junction to an output impedance 139, the latter impedance representing the impedance of any circuit utilizing the gated pulse 130 impressed on impedance 139 by the gating circuit in the manner which will be described below.

The cathode 124 and grid 128 of triode 123 are also connected to a source 121 of input pulses, indicated here as two terminals, these pulses being the gating pulses 120 impressed on the cathode 124 of triode 123 through a condenser 122. Gating pulses 120 are indicated here as being positive, the time constants of the grid and cathode circuits being such that the grid 128 is effectively rendered negative with respect to the cathode 124 during the application of a pulse.

The operation of the circuit will be explained by discussing first the quiescent operation, then the rejection of input signals when no gate pulse is applied, and will be concluded by the description of the gating function of the circuit.

The quiescent operation of the circuit is as follows. In the absence of the gating pulse 120, the gate tube 123 will conduct a current of the order of 10 milliamperes in the selected example. The full amount of this current flows through diode 117 creating a voltage drop of the order of 1 volt, thus placing junction 116 at a potential approximately 1 volt below the power supply voltage.

In the absence of a signal at the input 101, the amplifier tube 103 is biased for class A operation and draws a current smaller than that drawn by gate tube 123.

If a continuous wave signal is applied to amplifier 103 by input circuit 101, since the forward impedance of the order of 100 ohms of diode 117 is effectively in parallel with the plate loads 112 and 113, a negative portion of the wave appearing as an output signal at junction 116 has a very small amplitude. Conversely, triode 123 acts as an effective shunting path when positive signals appear at junction 116. The above is described more in detail below.

The signal rejection ratio depends upon the ratio of the amplifier plate load impedance 112 and 113 to the forward impedance of the diode, and upon the co-action of these elements. If for maintaining maximum amplifier gain an optimum value of the plate load resistor 112 is 4,000 ohms, this value, combined with the forward impedance of diode 117 of the order of 100 ohms, produces for undesired signals a rejection ratio of the order of 30 to 1.

If a transient consisting of a positive pulse is applied to the input circuit 101, current through tube 103 will increase, and the additional current will be drawn through diode 117 resulting in a small increase in the voltage drop across diode 117 and a corresponding small drop in potentials at junctions 111 and 116.

If the signal applied to input circuit 101 is a large negative pulse, current through tube 103 will be entirely cut off and the voltage at junction 111 will rise toward the value of the power supply 114. In order for this change to occur, the capacitor 115 must alter its charge; a transient current will therefore flow from junction 111 into capacitor 115, the initial value of this current being not greater than the current which was previously flowing through the amplifier load. This same transient current will flow from capacitor 115 to junction 116, and since total current through gate tube 123 will remain essentially constant, this current flow from capacitor 115 to junction 116 will cause a corresponding reduction in the current through diode 117. Since the current previously flowing through diode 117 was greater than the current through the amplifier plate load, the transient will reduce but will not eliminate the current through diode 117, and hence the voltage at junction 116 will remain substantially the same.

Gating occurs when pulse 100 and gate pulse 120 are applied simultaneously. The application of the gating pulse 120 causes gate tube 123 to be cut off and the junction 116 to be effectively at the power supply potential, i. e., the pedestal is of the order of 1 volt in the selected example. The input pulse 100, being a negative pulse, becomes a positive pulse at the amplifier output and at junction 116; all of the pulse at junction 116 is positive with respect to the power supply potential, hence diode 117 presents its back impedance and therefore is incapable of shunting the pulse of this polarity; nor can it be shunted by triode 123 because the latter is held nonconductive by the negative gate pulse impressed on its grid. The pulse therefore is passed directly to the output impedance 139 with only negligible attenuation resulting from the back impedance of diode 117 and the plate-to-cathode capacitance of gate tube 123, the effect of the latter being at least partially compensated for by peaking coil 113 in the amplifier circuit.

Figure 2:
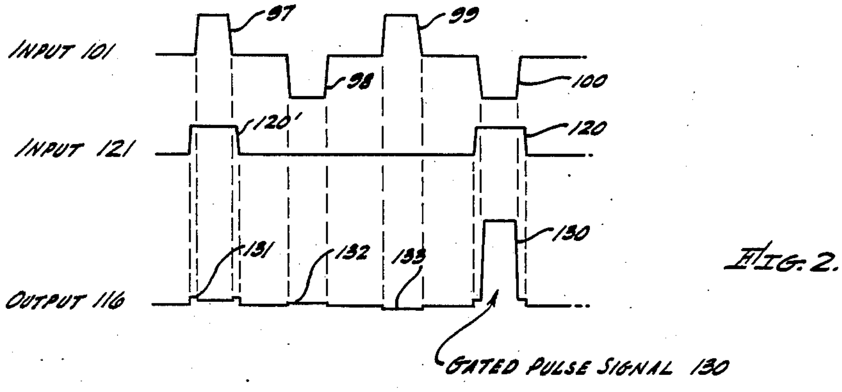
Fig. 2 illustrates the waveforms and phase relationship of input and output voltage signals.

Fig. 2 illustrates the above-described functioning of the circuit, the input signals being signals 97 through 100, the gate pulses are pulses 120 and 120′, and the resulting output voltage at junction 116 is represented by pulses 130 through 133. When no gate pulse is applied, the negative input pulse 98 and positive input pulse 99 produce very small positive output pulse 132 and negative pulse 133, respectively. Gating occurs when the negative pulse 100 and gate pulse 120 are applied simultaneously, the gated pulse signal 130 appearing at the output consisting of a small pedestal voltage plus the inverted and amplified pulse 100. Any negative signals appearing at the output during the gating interval are effectively shunted out by conduction through diode 117, as illustrated by the simultaneous application of positive pulse 97 and gate pulse 120′ resulting in pulse 131.

From the foregoing description, it can be seen that the circuit effectively rejects both continuous and transient signals outside the gating interval, while during the gating interval negative pulses are rejected and positive pulses are passed with negligible attenuation.

Inclusion of capacitor 115 makes it possible to achieve a low pedestal at the output during the gating interval. The size of capacitor 115 is a design consideration in that it must be sufficiently large to pass the desired signals without distortion. Furthermore, in order for undesired signals existing in the circuit immediately prior to the commencement of a gating interval to be effectively disposed of without spilling over into the gating interval, capacitor 115 must be large enough so that the time constant of the circuit including capacitor 115 and amplifier 103 will be of the order of 100 times the width of pulses desired to be rejected.

A variety of gate pulses may be used with the disclosed circuit. The basic requirement is that the pulse be large enough to make and hold tube 123 non-conductive when the voltage at junction 116 is equal to the power supply voltage plus the magnitude of the positive output pulses, the shape of the pulse being immaterial so long as its amplitude exceeds this amount.

In the circuit as shown, positive gate pulses are fed to the cathode 124 of gate tube 123; the advantage of this is that distortion of the gate pulse by the inter-electrode capacitances of gate tube 123 is minimized. Of course, negative gate pulses applied directly to grid 128 may also be employed.

In order to ensure proper shunting of signals to be rejected by the gating circuit, it is essential that the output impedance 139, representing the impedance of the circuit receiving the gated signal 130, must be of the order of 10 times the forward impedance of the diode 117.

Figure 3:
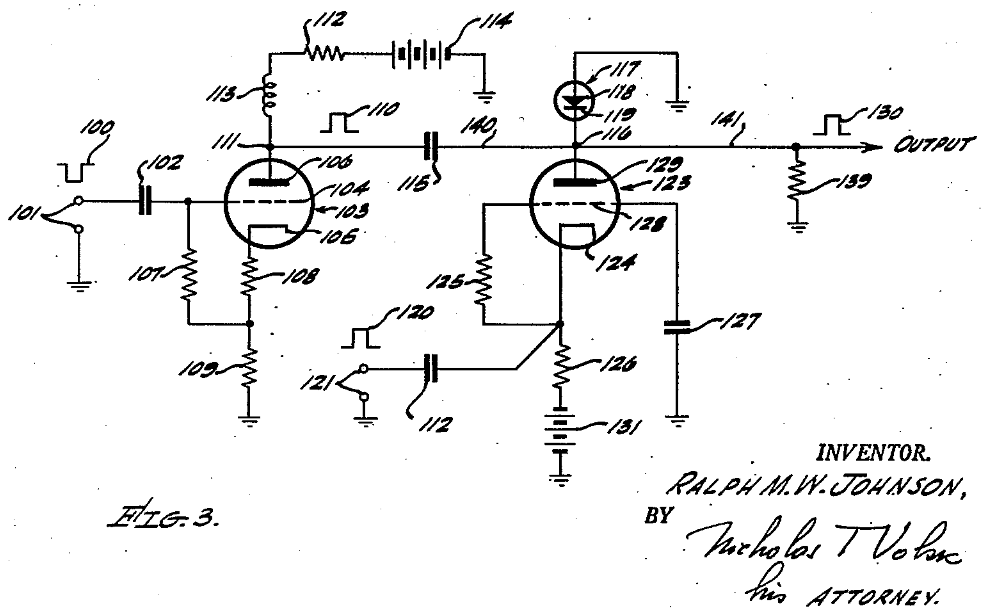
Fig. 3 is a schematic diagram of a modified form of the gating circuit.

Some applications require a driving signal clamped at ground potential. This requirement is satisfied by the circuit of Fig. 3, which utilizes two power supplies. The series circuit, comprising diode 117 and gate tube 123, is energized by a negative source of potential 131 connected to cathode resistor 126, with anode 118 of the diode being grounded. All other connections are the same as in Fig. 1, and the circuit operation is the same.

While the disclosed circuits select input pulses of the negative polarity only, by the addition of another amplifier stage ahead of triode 103 input pulses of the positive polarity could be selected.

What is claimed as new is:

1. An electronic gating circuit comprising a class A video amplifier; a coupling capacitor; and a shunting circuit; said amplifier comprising a load impedance and a first vacuum tube with a grid and a plate, said load impedance being connected to said plate; said shunting circuit comprising a power supply, a diode having an anode and a cathode, and a second vacuum tube having a grid, a plate, and a cathode, a connection between the cathode of said diode and the plate of said second tube, said diode and said second tube forming a series circuit which is normally conductive; said capacitor interconnecting the plates of said first and second tubes; and means for applying positive gate pulses to the cathode of said second tube for rendering said tube nonconductive, whereby, upon the application of a signal to the grid of said first tube, unidirectional portions of said signal, coincident with said gate pulses, appear at said connection.

2. An electronic gating circuit comprising an input capacitor; a shunting circuit selectively operable in response to applied gating pulses; an output junction connected to said capacitor; an output circuit connected to said junction; means for applying input signals to be gated to said capacitor; said shunting circuit comprising a unilaterally conducting device, a gate-control tube, power supply means, said unilaterally conducting device having an anode connected to said power supply means and a cathode connected to said junction, said tube having a plate connected to said junction, a grid and a cathode, said shunting circuit also including a first resistor connected between said grid and the cathode of said tube, and a second resistor connected between the cathode of said tube and said power supply means, thereby to render said series circuit normally conductive; and means for applying positive gating pulses to the cathode of said tube, whereby selected positive portions of said input signals are passed to said output circuit during the occurrence of a gating pulse, the impedance of said output circuit being of the order of at least ten times the forward impedance of said unilaterally conducting device.

3. An electronic gating circuit for selectively passing with minimum distortion unidirectional pulses having a duration of the order of one microsecond, said gating circuit comprising a class A video amplifier; a coupling capacitor; a shunting circuit; said amplifier comprising a first vacuum tube having a grid and a plate, and an inductive load impedance connected to said plate; said shunting circuit comprising a diode having an anode and a cathode, a second vacuum tube having a grid, a plate and a cathode, first and second resistors, the cathode of said diode being connected to the plate of said second tube, said first resistor being connected between the grid and the cathode of said second tube, said second resistor being connected between the cathode of said second tube and the anode of said diode, whereby said diode and said second tube form a series circuit, and power supply means connected between said anode and said second resistor whereby said series circuit is normally conductive; said capacitor interconnecting the plates of said first and second tubes; and means for applying positive gate pulses to the cathode of said second tube.

References Cited in the file of this patent

UNITED STATES PATENTS

| | | |
|---|---|---|
| 2,443,195 | Pensyl | June 15, 1948 |
| 2,525,106 | Wendt | Oct. 10, 1950 |
| 2,564,017 | Maggio | Aug. 14, 1951 |
| 2,597,796 | Hindall | May 20, 1952 |

FOREIGN PATENTS

| | | |
|---|---|---|
| 580,575 | Great Britain | Sept. 12, 1946 |